US006467803B2

(12) United States Patent
Dirmeyer et al.

(10) Patent No.: US 6,467,803 B2
(45) Date of Patent: Oct. 22, 2002

(54) DEVICE FOR TRIGGERING AN AIRBAG DEVICE WHICH IS ACCOMMODATED IN A STEERING WHEEL

(75) Inventors: Josef Dirmeyer, Bodenwoehr; Claus Schmidt, Regensburg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/078,996

(22) Filed: Feb. 20, 2002

(65) Prior Publication Data

US 2002/0096870 A1 Jul. 25, 2002

Related U.S. Application Data

(63) Continuation of application No. PCT/DE00/02777, filed on Aug. 16, 2000.

(30) Foreign Application Priority Data

Aug. 20, 1999 (DE) .......................................... 199 39 502

(51) Int. Cl.[7] .............................................. B60R 21/26
(52) U.S. Cl. ...................... 280/731; 280/735; 280/741; 102/201; 385/25; 385/147
(58) Field of Search ................................. 280/731, 735, 280/736, 741; 102/201; 385/25, 147; 439/15

(56) References Cited

U.S. PATENT DOCUMENTS

| | | | | |
|---|---|---|---|---|
| 4,848,867 A | * | 7/1989 | Kajioka et al. | 250/227.11 |
| 4,870,903 A | * | 10/1989 | Carel et al. | 102/201 |
| 4,909,589 A | * | 3/1990 | Morris | 385/25 |
| 4,917,014 A | * | 4/1990 | Loughry et al. | 102/201 |
| 5,010,822 A | | 4/1991 | Folsom | |
| 5,039,193 A | * | 8/1991 | Snow et al. | 385/25 |
| 5,460,407 A | * | 10/1995 | Stuckle | 102/201 |
| 5,505,483 A | * | 4/1996 | Taguchi et al. | 280/728.2 |
| 5,633,963 A | * | 5/1997 | Rickenbach et al. | 385/139 |
| 5,660,413 A | | 8/1997 | Bergseron et al. | |
| 5,810,606 A | * | 9/1998 | Ballast et al. | 385/26 |

FOREIGN PATENT DOCUMENTS

| | | |
|---|---|---|
| DE | 31 11 339 A1 | 1/1982 |
| DE | 196 43 451 A1 | 8/1997 |
| DE | 196 33 409 C1 | 1/1998 |
| DE | 196 49 910 A1 | 6/1998 |
| DE | 198 32 256 A1 | 4/1999 |
| EP | 0 543 483 A1 * | 5/1993 |
| EP | 0 641 689 A2 | 3/1995 |
| EP | 0 776 794 A2 | 6/1997 |

\* cited by examiner

*Primary Examiner*—Paul N. Dickson
*Assistant Examiner*—Ruth Ilan
(74) *Attorney, Agent, or Firm*—Laurence A. Greenberg; Werner H. Stemer; Gregory L. Mayback

(57) ABSTRACT

A device for triggering an airbag device that is accommodated in a steering wheel is described. The device has a firing cap for an airbag device that is accommodated in a steering wheel and is fired by a light pulse that is supplied via an optical waveguide. A coupling device, which decouples the optical waveguide from the rotation of the steering wheel but ensures that the light pulse is transmitted into the firing cap from the optical waveguide and also ensures that the airbag is inflated by a gas generator, is provided between the optical waveguide and the airbag.

9 Claims, 3 Drawing Sheets

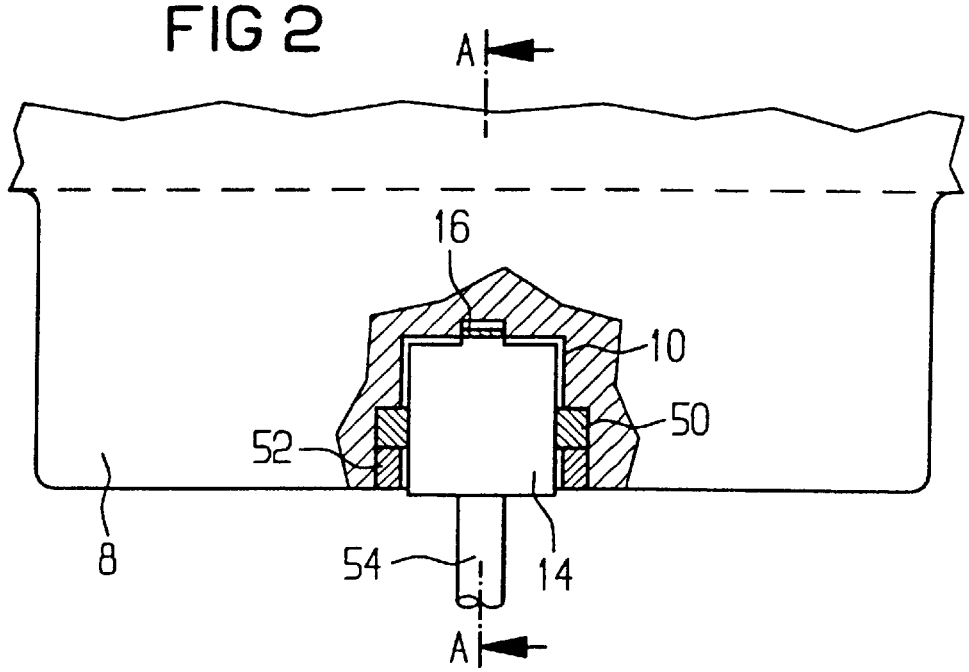
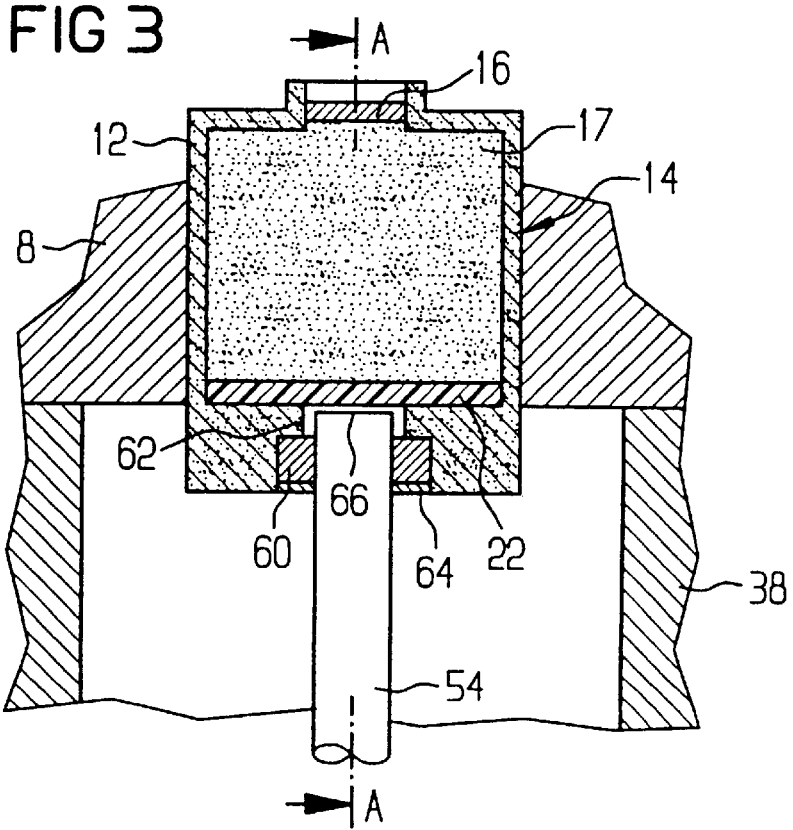

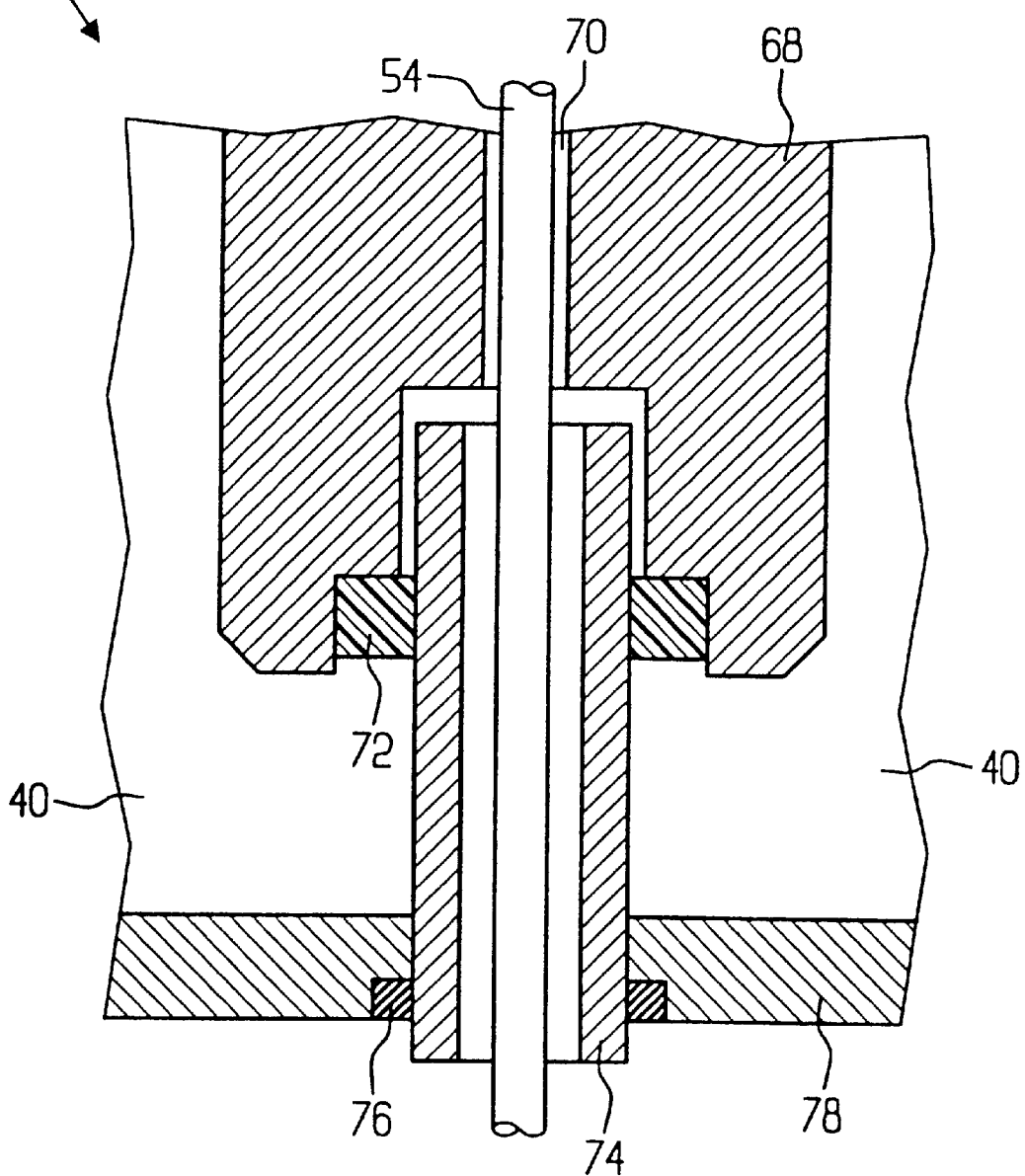

DEVICE FOR TRIGGERING AN AIRBAG DEVICE WHICH IS ACCOMMODATED IN A STEERING WHEEL

CROSS REFERENCE TO RELATED APPLICATION

This application is a continuation of copending International Application PCT/DE00/02777, filed Aug. 16, 2000, which designated the United States.

BACKGROUND OF THE INVENTION

Field of the Invention

The invention relates to a device for triggering an airbag device accommodated in a steering wheel. The device contains a gas generator for inflating an airbag, a firing cap for firing the gas generator and an optical waveguide that is connected to a light source remote form the steering wheel and has the purpose of supplying the firing cap with a light pulse which fires the firing cap.

A device of the generic type is known from the German Patent DE 196 33 409 C1. The optical waveguide, for example a glass fiber, is optically connected to the firing cap in such a way that the firing cap is directly fired by light pulses with a sufficient energy content, whereas light pulses with a smaller energy content are used as test pulses which can be reflected using suitable devices and used to check the optical waveguide. The aforesaid patent does not contain any details on the connection of the optical waveguide to the firing cap. This connection is generally of rigid construction, which leads to increased constructional complexity in an airbag device which is accommodated in a steering wheel and rotates with the steering wheel because such optical waveguides can in themselves only be twisted to a small degree.

SUMMARY OF THE INVENTION

It is accordingly an object of the invention to provide a device for triggering an airbag device that is accommodated in a steering wheel which overcomes the above-mentioned disadvantages of the prior art devices of this general type, which has a simple structure with a high degree of functional reliability.

With the foregoing and other objects in view there is provided, in accordance with the invention, a device for triggering an airbag device accommodated in a steering wheel assembly having a steering wheel. The device contains a gas generator for inflating an airbag, a firing cap for firing the gas generator, a light source, and a coupling device having an optical waveguide connected to the light source remote from the steering wheel. The light source supplies the firing cap with a light pulse for firing the firing cap. The coupling device is disposed at least approximately concentrically with respect to an axis of rotation of the steering wheel. The coupling device is disposed between the airbag and the light source, and the coupling device configured such that the optical waveguide is isolated from a rotation of the steering wheel and ensures a functional connection of the optical waveguide to the firing cap.

According to the invention, the optical waveguide via which the light pulses for firing the firing cap are fed in from a light source is decoupled from the steering wheel in terms of rotation of the steering wheel so that the optical waveguide is not torsionally loaded. The coupling device, via which the rotational decoupling and the functional coupling are effected in the transmission path from the optical waveguide via the firing cap to the gas generator and from there to the airbag, is disposed concentrically or coaxially with respect to the axis of rotation of the steering wheel so that the function is ensured irrespective of the rotary position of the steering wheel.

In accordance with an added feature of the invention, the optical waveguide is a two-piece waveguide with an end part to be fixed to the steering wheel and ends at the firing cap, and a feed part starting from the light source. The feed part is isolated from the steering wheel in terms of its rotatability. The feed part has a first light exit window and the end part has a second light entry window disposed opposite the first light exit window of the feed part coaxially with the axis of rotation of the steering wheel.

In accordance with an additional feature of the invention, the decoupling device includes a bearing to be attached to a steering column of the steering wheel. The feed part has a steering-wheel end accommodated in the bearing and the steering column is connected fixed in terms of rotation to the steering wheel.

In accordance with another feature of the invention, the gas generator is to be connected fixed in terms of rotation to the steering wheel and is rotatable in relation to the firing cap, and the firing cap is provided coaxially to the axis of rotation of the steering wheel and is decoupled from the steering wheel in terms of rotation.

In accordance with a further feature of the invention, the gas generator has a recess formed therein and the firing cap is accommodated in the recess. The decoupling device has a bearing disposed between the gas generator and the firing cap.

In accordance with another added feature of the invention, the firing cap is connected fixed in terms of rotation to the steering wheel and is rotatable in relation to an end of the optical waveguide facing the firing cap.

In accordance with another additional feature of the invention, the firing cap has a housing with a through-opening formed therein, and the optical waveguide is accommodated in the through-opening in the housing of the firing cap. The decoupling device has a bearing disposed in the housing and the optical waveguide has an end part accommodated in the bearing.

In accordance with another further feature of the invention, the end part of the optical waveguide has a light exit window, and a fluorescent film is disposed between the light exit window of the optical waveguide and the firing cap.

In accordance with a concomitant feature of the invention, the steering wheel assembly has a steering column connected fixed in terms of rotation to the steering wheel. The decoupling device has a bridging tube to be disposed in the steering column and rigidly connected to a wall of the steering wheel assembly. The optical waveguide is guided from an exterior space through the bridging tube into an interior of the steering column. The decoupling device has a bearing disposed between the bridging tube and the steering column.

Other features which are considered as characteristic for the invention are set forth in the appended claims.

Although the invention is illustrated and described herein as embodied in a device for triggering an airbag device which is accommodated in a steering wheel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a detailed, sectional view of a further embodiment of the airbag device;

FIG. 3 is a detailed sectional view of a modified embodiment of the airbag device; and FIG. 4 is a detailed sectional view for explaining how an optical waveguide is led through to a steering spindle.

DESCRIPTION OF THE PREFERRED EMBODIMENTS

Figure 1:
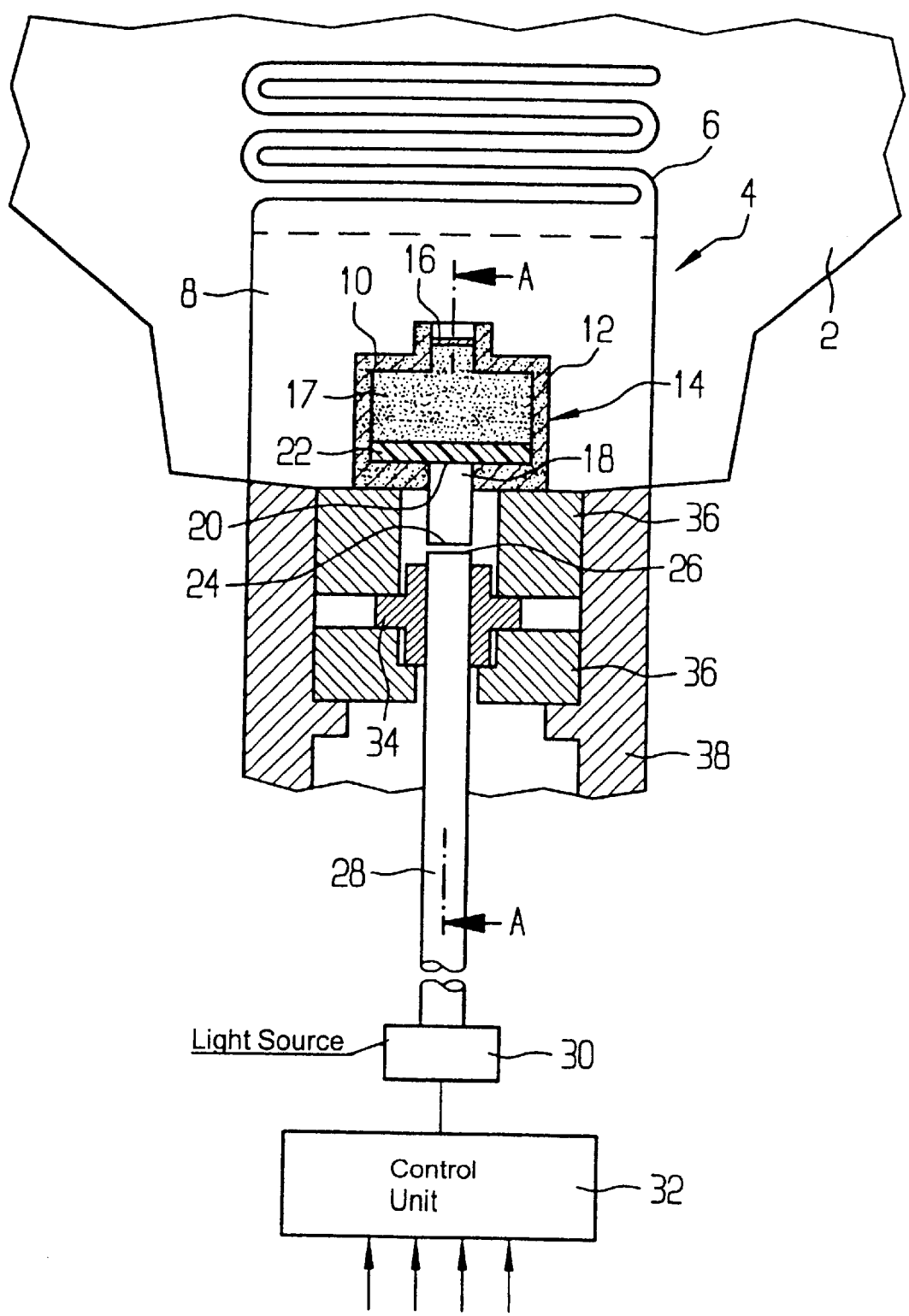
FIG. 1 is a diagrammatic, sectional view of a first embodiment of an airbag device that is fixed to a steering wheel and is triggered by a light pulse according to the invention.

Referring now to the figures of the drawing in detail and first, particularly, to FIG. 1 thereof, there is shown an airbag device which is designated in its entirety by reference numeral 4 and is accommodated in a steering wheel which is illustrated in an approximate form and designated by reference numeral 2.

The airbag device 4 includes an airbag 6 (illustrated in its folded-up position) that is attached to a gas generator 8 that is rigidly connected to the steering wheel 2. The gas generator 8 has a recess 10 that accommodates a housing 12 of a firing cap that is designated in its entirety by 14.

The housing 12 is closed off from the gas generator 8 by a plate 16. A highly flammable firing powder 17 is accommodated in the interior of the housing 12.

The housing 12 has a through-opening which is directed downward according to Fig.1 and in which an end part 18 of an optical waveguide is attached, for example by bonding. A light exit window 20 of the end part 18 directly adjoins the firing powder 17 or a fluorescent film 22 that is disposed on a floor of the housing 12.

A light exit window 26 of a feed part 28 of the optical waveguide is disposed opposite the light entry window 24 of the end part 18, the optical waveguide being divided in two and being connected to a light source 30 which is embodied, for example, as a laser diode and is actuated by a control unit 32. A free end region of the feed part 28 is secured in a sliding bearing 34 that is accommodated between two securing bushings 36, which are inserted into a steering column 38 that is connected fixed in terms of rotation to the steering wheel 2.

The entire configuration is such that the light entry window 24, which rotates along with the steering wheel 2, of the end part 18 is aligned concentrically with respect to the axis A—A of rotation of the steering wheel 2 and of the steering column 38, respectively. The light exit window 26 of the feed part 28 is located opposite the light entry window 24 and at a short distance from it. The light exit window 26 is also aligned concentrically with respect to the axis A—A of rotation so that when the steering wheel 2 rotates, the alignment of the two windows 24 and 26 with respect to one another is maintained, while the feed part 28 does not rotate owing to its positioning within the steering column 38. It goes without saying that the entire firing cap 14, with the end part 18, are advantageously aligned concentrically with respect to the axis A—A of rotation. The concentric alignment of the windows 24 and 26 does not have to be completely precise; it is sufficient if a significant overlap is maintained during rotation.

The function of the airbag device 4 and the firing of the firing cap 14 by a light pulse which is output by the light source 30 and the generation of gas in order to inflate the airbag 6 in the gas generator 8 after its activation by firing the firing cap 14 and exploding the plate 16 are known per se and are therefore not explained. The configuration of the windows 24 and 26 at a small mutual distance and coaxially with respect to the axis A—A of rotation constitutes a coupling device which is used to decouple the feed part 28 of the optical waveguide from the rotation of the steering wheel 2, but the optical and functional coupling between the feed part 28 and the end part 18 or firing cap 14 is ensured. It goes without saying that the gap between the two windows 24 and 26 is small so that the transmission of the light pulse from the feed part 28 into the end part 18 takes place without significant optical losses. The function of the fluorescent film 22 is that when there is directional use of the optical waveguide for diagnostic purposes, the fluorescent film is excited by weak test pulses and light is irradiated back into the optical waveguide.

FIG. 2 shows a modified embodiment of a coupling device, the same reference symbols as in FIG. 1 being used for functionally identical components.

In contrast to the embodiment according to FIG. 1, in the embodiment according to FIG. 2 the firing cap 14 is mounted concentrically with respect to the axis A—A of rotation of the steering wheel 2 in the gas generator 8 so as to be capable of rotating with the aid of a sliding bushing 50 which is inserted into the recess 10 of the gas generator 8. In order to protect the sliding bushing 50, an attachment bushing or screw bushing 52 is screwed into the gas generator 8. Because the firing cap 14 in the embodiment according to FIG. 2 is decoupled in terms of rotation from the gas generator 8 that is rigidly connected to the steering wheel 2, the optical waveguide 54 can be embodied in one part and rigidly connected to the firing cap 14 or to the housing 12.

When the firing cap 14 is fired using a light pulse that is fed by the optical waveguide 54, energy that is released owing to the ignition of the firing powder is conducted into the gas generator 8 where it triggers the generation of gas, which inflates the airbag 6. The decoupling in terms of rotation but functional coupling between the optical waveguide 54 and the gas generator 8 or the airbag 6 is achieved in the embodiment according to FIG. 2 by the positioning of the firing cap 14 in the gas generator 8.

FIG. 3 shows an embodiment which is modified with respect to FIG. 1 in a different way to that of FIG. 2. In the embodiment according to FIG. 3, the firing cap 14 is in turn rigidly connected to the gas generator 8 that is rigidly connected to the steering wheel 2. The end of the optical waveguide 54 is accommodated in a sliding bushing 60 that is inserted into a through-hole 62 in the base wall of the housing 12 of the firing cap 14. In order to secure the sliding bushing 60, a screw bushing 64 is provided. A light exit window 66 of the optical waveguide 54 is located directly underneath the fluorescent film 22, which is inserted into the base region of the firing cap 14. The decoupling in terms of rotation between the rotation of the steering wheel 2 and of the steering column 38 and the optical waveguide 54 takes place as a result of its positioning in the through-hole 62. The functional coupling is affected directly underneath the fluorescent film 22 by the configuration of the light exit window 66. Of course, the configuration is again advantageously effected such that there is concentricity with the axis A—A of rotation.

FIG. 4 shows an exemplary embodiment indicating how the optical waveguide 54 is introduced into the interior of the steering column 38 or of a steering spindle 68 that is disposed at the end of the steering column 38. The steering spindle 68, which operates in a steering gear known per se, whose interior is filled with hydraulic fluid 40 or steering oil, has a through-duct 70. A bridging tube 74, which is led through a wall 78 of the steering gear while being sealed by a sealing ring 76 is inserted into a step-shaped widening at the end of the through-duct 70 with intermediate configuration of a radial shaft sealing ring 72. In this way, the through-duct 70 of the steering spindle 68 passes on toward the outside through the bridging tube 74, which is decoupled in terms of rotation from the steering wheel 2 using the radial shaft sealing ring 72, so that the optical waveguide 54 can be introduced. The seals 72 and 76 enable the through-duct 70 or the interior of the junction tube 74 to be separated in a sealed fashion from the interior of the fluid-filled steering gear.

Of course, the invention can be used and modified in various ways. For example, the steering spindle 68 in FIG. 4 does not have to interact in a direct mechanical fashion with the actual steering gear or a steering tie rod. The steering spindle 68 or the steering column 38 (FIG. 1) can also be the steering sensor of a steering system in which the steering gear which actuates the steering tie rods is controlled via hydraulic lines or electrical lines. The decoupling in terms of rotation between the steering wheel 2 and the optical waveguide can also be effected in such a way that the entire airbag device is decoupled in terms of rotation from the steering wheel 2 or only the airbag 6 is attached fixed in terms of rotation to the steering wheel 2 and can rotate in relation to the gas generator 8. The fluorescent film 22 is not necessarily a component of the configuration. The firing powder or the firing material can be fired directly by the light pulse that emerges from the directly adjoining light exit window of the optical waveguide.

We claim:

1. A device for triggering an airbag device accommodated in a steering wheel assembly having a steering wheel, the device comprising:

a gas generator for inflating an airbag;

a firing cap for firing said gas generator;

a light source; and a coupling device having an optical waveguide connected to said light source remote from the steering wheel, said light source supplying said firing cap with a light pulse for firing said firing cap, said coupling device disposed at least approximately concentrically with respect to an axis of rotation of the steering wheel, said coupling device disposed between the airbag and said light source, said coupling device configured such that said optical waveguide is isolated from a rotation of the steering wheel and such that said coupling device ensures a functional connection of said optical waveguide to said firing cap.

2. The device according to claim 1, wherein said optical waveguide is a two-piece waveguide with an end part to be fixed to the steering wheel and ending at said firing cap, and a feed part starting from said light source, said feed part is isolated from the steering wheel in terms of its rotatability, said feed part having a first light exit window and said end part having a second light entry window disposed opposite said first light exit window of said feed part coaxially with the axis of rotation of the steering wheel.

3. The device according to claim 2, wherein said coupling device includes a bearing to be attached to a steering column of the steering wheel, and said feed part has a steering-wheel end accommodated in said bearing and the steering column is connected fixed in terms of rotation to the steering wheel.

4. The device according to claim 1, wherein said gas generator is to be connected fixed in terms of rotation to the steering wheel and is rotatable in relation to said firing cap, and said firing cap is provided coaxially to the axis of rotation of the steering wheel and is decoupled from the steering wheel in terms of rotation.

5. The device according to claim 4, wherein said gas generator has a recess formed therein and said firing cap is accommodated in said recess, and said coupling device has a bearing disposed between said gas generator and said firing cap.

6. The device according to claim 1, wherein said firing cap is connected fixed in terms of rotation to the steering wheel and is rotatable in relation to an end of said optical waveguide facing said firing cap.

7. The device according to claim 6, wherein said firing cap has a housing with a through-opening formed therein, and said optical waveguide is accommodated in said through-opening in said housing of said firing cap, and said coupling device having a bearing disposed in said housing and said optical waveguide has an end part accommodated in said bearing.

8. The device according to claim 7, wherein said end part of said optical waveguide has a light exit window; and including a fluorescent film disposed between said light exit window of said optical waveguide and said firing cap.

9. The device according to claim 1, wherein the steering wheel assembly has a steering column connected fixed in terms of rotation to the steering wheel, said coupling device having a bridging tube to be disposed in the steering column and rigidly connected to a wall of the steering wheel assembly, said optical waveguide is guided from an exterior space through bridging said tube into an interior of the steering column, said coupling device having a bearing disposed between said bridging tube and the steering column.

* * * * *